Sept. 24, 1929.  E. B. MILLER ET AL  1,729,083
REFRIGERATION PROCESS AND APPARATUS
Filed March 11, 1925
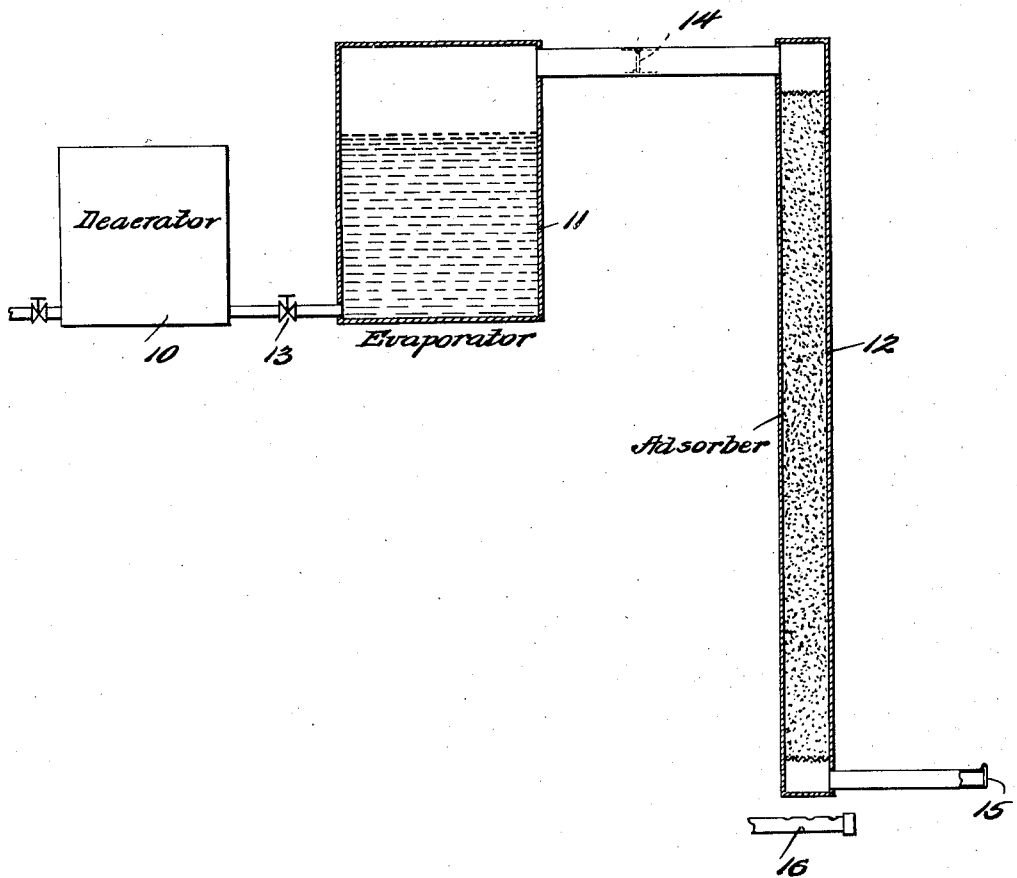

Patented Sept. 24, 1929

1,729,083

UNITED STATES PATENT OFFICE

ERNEST B. MILLER AND WALTER L. EDEL, OF BALTIMORE, MARYLAND, ASSIGNORS TO THE SILICA GEL CORPORATION, OF BALTIMORE, MARYLAND, A CORPORATION OF MARYLAND

REFRIGERATION PROCESS AND APPARATUS

Application filed March 11, 1925. Serial No. 14,759.

This invention relates to refrigeration, and more particularly to a refrigerating process and apparatus in which the refrigerating effect is secured by the evaporation of a liquid, the vapor from the liquid being adsorbed in the pores of a porous material in the substantial absence of permanent gases, and the porous material being thereafter treated to liberate the adsorbed vapor, so that the material may be used for another adsorbing cycle.

The present invention constitutes an improvement on the inventions disclosed in applications Serial Nos. 675,929 and 688,020.

The principal aim of this invention is to provide a refrigerating system of the above type which will free itself during normal operation of any permanent gases that may accumulate due to leakage or otherwise, to the extent of not materially interfering with the evaporation of the solution in the evaporator, or the adsorption of the vapors by the adsorbent. The apparatus is normally leak-proof against external atmospheric pressure.

It is a further object of this invention to simplify the apparatus by the elimination of the condenser usually employed in such systems, the adsorbed vapor liberated from the porous material being exhausted to the atmosphere.

A still further object is to provide a refrigerating process and apparatus of the type above described in which all vacuum pumps and similar machinery are eliminated, the only requirements for operating the apparatus being a supply of water and a source of heat.

Adsorbing materials suitable for the present invention should have pores of such size that the material will adsorb water vapor to such an extent as to contain not less than about 10% of its own weight of water when in equilibrium with water vapor at 30° C. and a partial pressure of substantially 22 mm. of mercury. Preferably silica gel is employed as the porous material. This material has pores of such size that it will adsorb water vapor to such an extent as to contain at least 21% of its own weight of water when in equilibrium with water vapor under the above conditions. But other adsorbents might be used provided they have a sufficient percentage of their internal volume made up of small pores. Thus, activated cocoanut charcoal, gels of oxide of tin, aluminum, tungsten, or iron, gels of combinations of two or more of these oxides, or gels of combinations of one or more of these oxides with silica, might be advantageously employed.

Solid porous adsorbents, such as, for example, silica gel, adsorb vapor, and particularly aqueous vapors, more rapidly and efficiently at pressures less than atmospheric when permanent gases are entirely absent. It is very difficult to prevent some slight entrance of air into the apparatus, either through faulty joints or valves, or in solution in the water admitted to the apparatus, or through the giving off of air by the material of the containers. According to this invention, this difficulty is overcome by completely removing the permanent gases after each adsorbing cycle.

An apparatus suitable for carrying out the invention is shown diagrammatically in the accompanying drawing, and consists simply of a deaerator 10, an evaporator 11, and an adsorber 12. A valve 13 controls the supply of liquid from the deaerator to the evaporator, a check valve 14 permits vapor from the evaporator to pass to the adsorber when the pressure in the latter is less than that in the former, and a second check valve 15 is adapted to open when the pressure in the adsorber is more than atmospheric to allow the adsorbed vapor to be discharged to the atmosphere. A heater 16 is provided to drive off the vapor from the porous material.

The deaerator 10 may be simply an ordinary boiler, and serves merely to remove the dissolved air from the supply liquid. The adsorber 12 is shown as of the air-cooled type, but obviously water or other cooling means might be employed if desired. The adsorber is filled with a suitable porous adsorbing material, such as, for example, silica gel.

In the operation of the apparatus, the evaporator 11 is filled to the proper level with a suitable refrigerating liquid. Brine is preferably employed for this purpose. The supply valve 13 being closed, the evaporator is then heated by some heating means, not shown, until the entire apparatus is filled with vapor, as shown by the free escape of vapor from the check valve 15. The permanent gases will then have been completely driven out of the apparatus, and the source of heat may be removed from the evaporator, and the latter allowed to cool down. The apparatus is now completely exhausted of permanent gases, and the regular refrigerating cycle may begin.

As the adsorbent is saturated with vapor from the liquid refrigerant, it is first necessary to activate it by removing the adsorbed vapor. For this purpose, heat is applied to the adsorber by means of the heater 16. The pressure thus created in the adsorber 12 closes the check valve 14 and opens the check valve 15, permitting the vapor to escape to the atmosphere. When this operation is substantially complete, the heater 16 is shut off, and the check valve 15 closes. The adsorber is then cooled by air, and the pressure in the adsorber drops, causing check valve 14 to open.

The liquid in the evaporator 11 is now evaporated by heat from the objects to be cooled and the vapor is adsorbed by the porous material in adsorber 12, a refrigerating effect being consequently produced in the former, and the heat of adsorption in the latter being conducted away by the cooling means. When the porous material has reached the limit of its adsorbing capacity, the heater 16 is again brought into operation, and the check valve 14 is closed and check valve 15 opened by the increase of pressure in the adsorber. The adsorbed vapor is then driven off as before, thus activating the porous material, and the system is ready for another cycle.

It will be observed that a certain amount of the refrigerant is thus lost during each cycle. It is therefore necessary to occasionally replenish the supply of liquid in the evaporator 11 by opening valve 13. This need not be done, however, after every cycle, as the amount lost is not large as compared to the capacity of the evaporator.

The apparatus is extremely simple, no vacuum pump or compressor or condenser being employed. The check valves 14 and 15 are preferably automatic in operation, but may be manually controlled if desired. In the former case, the only manipulation required is to start and stop the heater 16 and occasionally open the valve 13 to replenish the supply of refrigerant in the evaporator. These parts may also be automatically operated if desired, and thermostatic control means may be employed for this purpose.

The evaporator is preferably connected to the top of the adsorber, and the exhaust check valve 15 connected to the bottom of the same. The reason for this mode of connection is that air is heavier than the vapor most generally employed, that is, water vapor, and consequently any air which may get into the apparatus will settle to the bottom of the adsorber, and will be driven out by the vapor exhausted during activation. It is, of course, obvious that if the specific vapor employed is heavier than air, these connections should be reversed.

Having thus described the invention, what is claimed as new and desired to be secured by Letters Patent is:

1. A process of refrigeration consisting in evaporating a liquid, adsorbing the vapor in the pores of a solid porous material in the substantial absence of permanent gases, liberating the vapor thus adsorbed, and venting liberated vapor together with any permanent gases present.

2. A process of refrigeration consisting in evaporating a liquid, adsorbing the vapor in silica gel in the substantial absence of permanent gases, liberating the vapor thus adsorbed, and venting liberated vapor together with any permanent gases present.

3. A process of refrigeration consisting in evaporating a liquid, adsorbing the vapor in a porous material in the substantial absence of permanent gases, liberating the vapor thus adsorbed, and venting liberated vapor to the atmosphere, the vapor acting to drive out any permanent gases.

4. A process of refrigeration consisting in evaporating a liquid, adsorbing the vapor in silica gel in the substantial absence of permanent gases, liberating the vapor thus adsorbed, and venting liberated vapor to the atmosphere, the vapor acting to drive out any permanent gases.

5. A process of refrigeration consisting in evaporating a liquid, adsorbing the vapor in the pores of a solid porous material in the substantial absence of permanent gases, liberating the vapor thus adsorbed by heating the porous material, and venting liberated vapor together with any permanent gases present.

6. A process of refrigeration consisting in evaporating a liquid, adsorbing the vapor in silica gel in the substantial absence of permanent gases, liberating the vapor thus adsorbed by heating the silica gel, and venting liberated vapor together with any permanent gases present.

7. A process of refrigeration consisting in evaporating a liquid, adsorbing the vapor in the pores of a solid porous material in the substantial absence of permanent gases, liberating the vapor thus adsorbed by heating the porous material, venting liberated vapor together with any permanent gases present, and cooling the porous material, thereby causing a repetition of the adsorbing cycle.

8. A process of refrigeration consisting in evaporating a liquid, adsorbing the vapor in silica gel in the substantial absence of permanent gases, liberating the vapor thus adsorbed by heating the silica gel, venting liberated vapor together with any permanent gases present, and cooling the silica gel, thereby causing a repetition of the adsorbing cycle.

9. A process of refrigeration consisting in evaporating a liquid, adsorbing the vapor in the pores of a solid porous material in the substantial absence of permanent gases, liberating the vapor thus adsorbed by heating the porous material, venting liberated vapor together with any permanent gases present, cooling the porous material, thereby causing a repetition of the adsorbing cycle, and supplying liquid to compensate for that lost.

10. A process of refrigeration consisting in evaporating a liquid, adsorbing the vapor in the pores of a solid porous material in the substantial absence of permanent gases, liberating the vapor thus adsorbed by heating the porous material, venting liberated vapor together with any permanent gases present, cooling the porous material, thereby causing a repetition of the adsorbing cycle, and supplying deaerated liquid to compensate for that lost.

11. A process of refrigeration consisting in evaporating a liquid, adsorbing the vapor in the pores of a solid porous adsorbing material in the absence of permanent gases, activating the material to place it in condition to again adsorb, and maintaining the system free of permanent gases by venting the gases into the atmosphere by the activation of the material.

12. Refrigerating apparatus including, in combination, an evaporator, an adsorber in communication therewith, said adsorber being charged with a solid porous material capable of adsorbing vapor from a liquid in the evaporator, said parts being substantially free of permanent gases, a valve between the evaporator and the adsorber, a second valve adapted to establish communication between the adsorber and the atmosphere, and means for freeing the porous material of the adsorbed vapor and venting any permanent gases through said second valve, so that said material may again adsorb.

13. Refrigerating apparatus including, in combination, an evaporator, an adsorber in comunication therewith, said adsorber being charged with porous material, said parts being substantially free of permanent gases, a valve between the evaporator and the adsorber adapted to open when the pressure in the former exceeds that in the latter, a second valve connected to the adsorber and adapted to open when the pressure in the adsorber exceeds that of the atmosphere, and means for heating the adsorber to free the porous material of the adsorbed vapor.

14. Refrigerating apparatus including, in combination, an evaporator, an adsorber in communication therewith, said adsorber being charged with porous material, said parts being substantially free of permanent gases, a valve between the evaporator and the adsorber adapted to open when the pressure in the former exceeds that in the latter, a second valve connected to the adsorber and adapted to open when the pressure in the adsorber exceeds that of the atmosphere, means for heating the adsorber to activate the porous material, and means for cooling the adsorber after activation and during adsorption.

15. Refrigerating apparatus including, in combination, an evaporator, an adsorber in communication therewith, said adsorber being charged with silica gel, said parts being substantially free of permanent gases, a valve between the evaporator and the adsorber adapted to open when the pressure in the former exceeds that in the latter, a second valve connected to the adsorber and adapted to open when the pressure in the adsorber exceeds that of the atmosphere, means for heating the adsorber to activate the silica gel, and means for cooling the adsorber after activation and during adsorption.

16. Refrigerating apparatus including, in combination, an evaporator, an adsorber in communication therewith, said adsorber being charged with porous material, said parts being substantially free of permanent gases, a check valve between the evaporator and the adsorber adapted to open when the pressure in the former exceeds that in the latter, a second check valve connected to the adsorber and adapted to open when the pressure in the adsorber exceeds that of the atmosphere, means for supplying water to said vaporator, and means for heating the adsorber to free the porous material of the adsorbed vapor.

In testimony whereof we hereunto affix our signatures.

ERNEST B. MILLER.
WALTER L. EDEL.